Dec. 3, 1963  J. R. CRISSEY ETAL  3,112,765
FLOW-CONTROL DEVICE
Filed Oct. 10, 1962  3 Sheets-Sheet 2
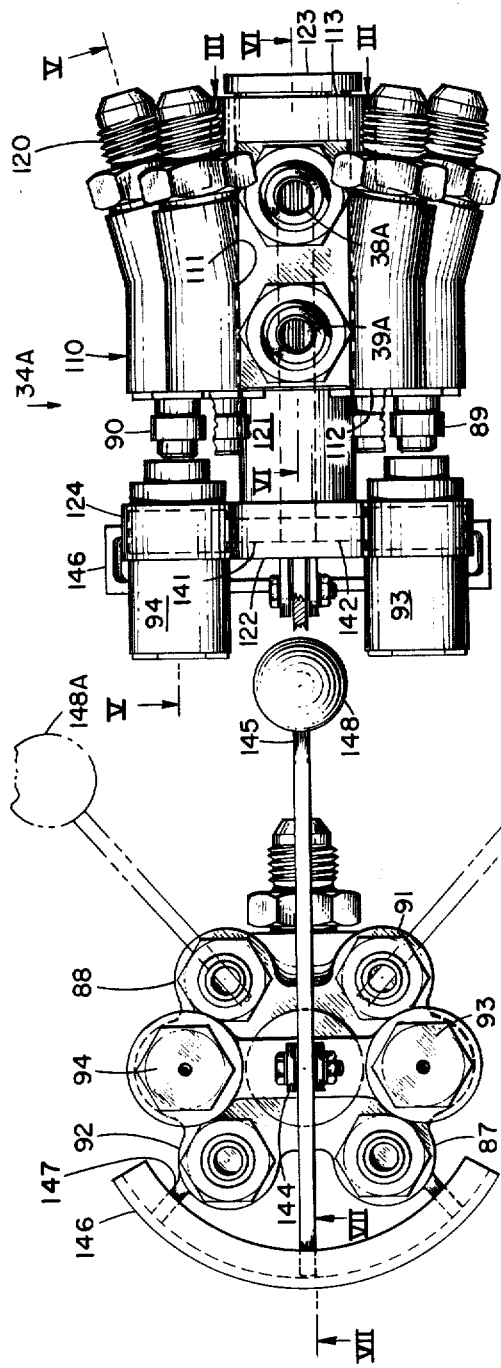
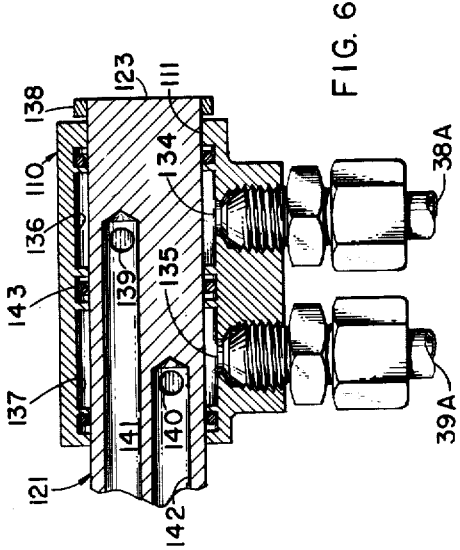
JACKSON R. CRISSEY
WILLIAM A. LANSING
INVENTORS
BY *H.C. Goldwire*
AGENT

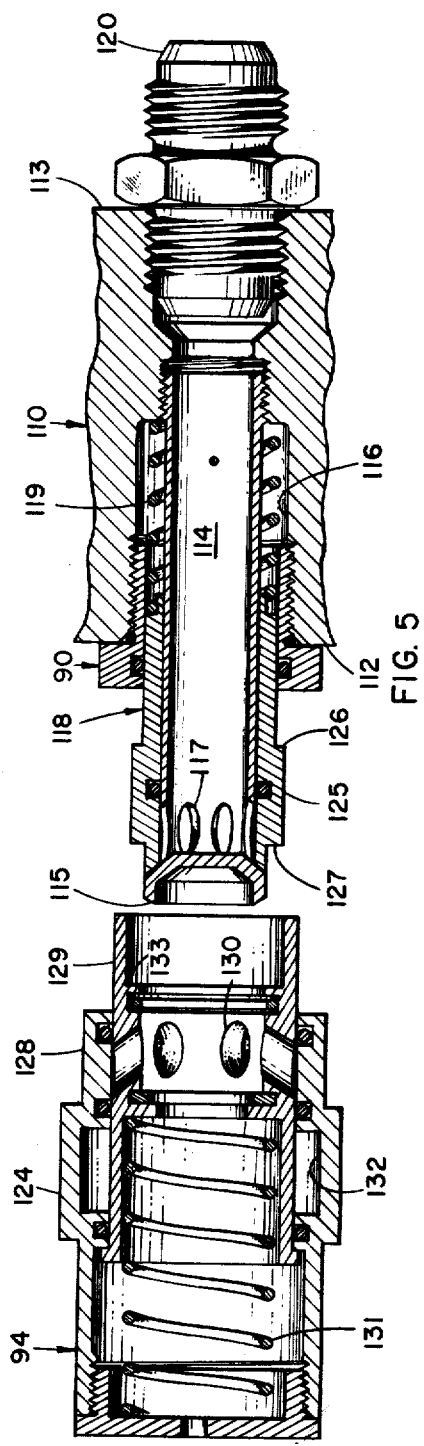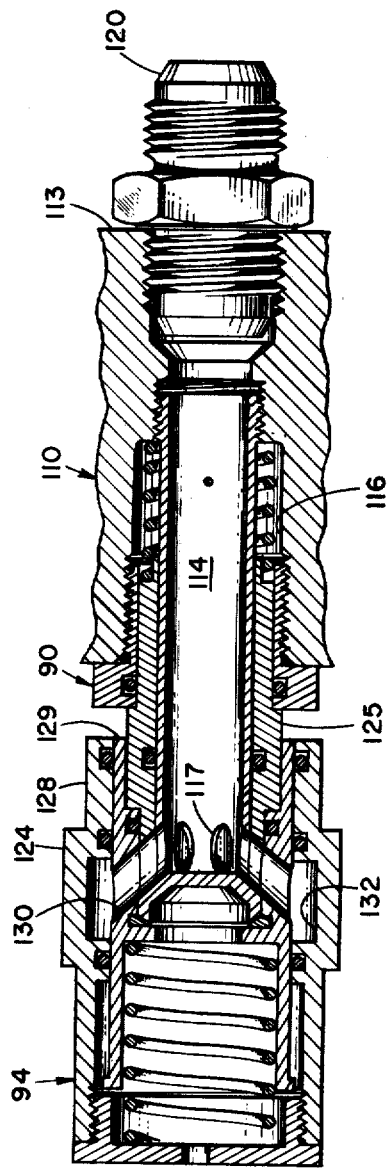

United States Patent Office 3,112,765
Patented Dec. 3, 1963

3,112,765
FLOW-CONTROL DEVICE
Jackson R. Crissey, Dallas, and William A. Lansing, Arlington, Tex., assignors to Ling-Temco-Vought, Inc., Dallas, Tex., a corporation of Delaware
Filed Oct. 10, 1962, Ser. No. 229,576
12 Claims. (Cl. 137—565)

This invention relates to fluid flow control devices and more particularly to means for selectively connecting a hydraulic power source into one or the other of a plurality of hydraulic systems without the possibility of interconnection of the systems.

For reliability, duplicate, independent hydraulic systems are customarily employed, in many types of aircraft, for actuation of devices such as flight control surfaces, etc. It is imperative that neither of the duplicate systems have, at any time, communication with the other, for a rupture in one system could cause failure of both if such communication existed. Further, the very close tolerances in many servo-controlled hydraulic valves makes these valves extremely subject to sticking and other malfunctioning when entered by even relatively small amounts of contaminants in the hydraulic fluid. Although extensive efforts are routinely made to prevent contamination of the hydraulic fluid, such contamination (as by metal particles from a failed pump) continue to occur, and it is obvious that foreign matter in the fluid of one system could enter and interfere with the operation of another system if the two systems were interconnected. It has been known to provide an emergency pump and valving for selectively connecting the same into one or another of independent hydraulic systems; but the valving has always been subject to the possibility of inadvertent connection of one system into the other or at least the leakage of fluid from a given system into another.

It is, accordingly, a major object of the present invention to provide a device for selectively connecting a hydraulic power source into one or the other of a plurality of independent hydraulic systems without any attendant possibility of interconnection of the independent systems or of leakage from one into the other.

A related object is to provide a device of the character mentioned wherein each of the independent hydraulic systems is always separated from each other of the independent hydraulic systems by at least one air space open to the atmosphere.

Another object is to provide a device, of the character indicated, which is relatively simple in construction and of high reliability.

Other objects and advantages will become apparent from the specification and claims and from the accompanying drawing illustrative of the invention.

Figure 1:
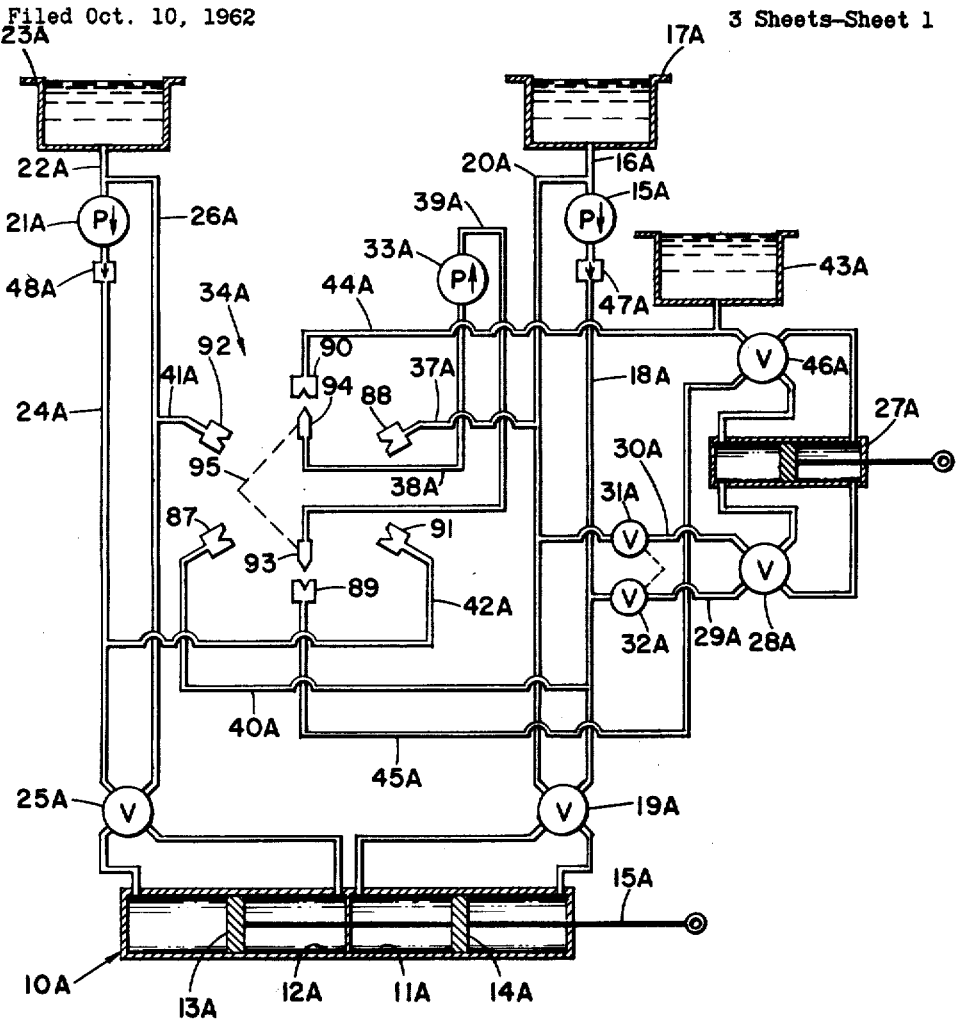
Figure 3:
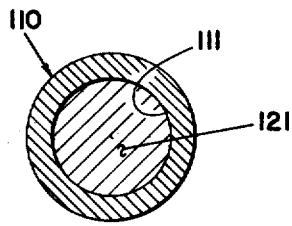

In the drawing:
FIGURE 1 is a schematic representation of a form of the flow-control device shown in FIGURES 2–8 and associated with a plurality of independent hydraulic systems;
FIGURE 2 is a side elevation of the flow-control device of FIGURE 1;
FIGURE 3 is a cross-sectional view taken as indicated by the arrows III—III of FIGURE 2;
FIGURE 4 is an end view of the flow-control device of FIGURE 2;
FIGURE 5 is a longitudinal sectional view taken as along line V—V of FIGURE 2;
FIGURE 6 is a longitudinal sectional view taken as at line VI—VI of FIGURE 2 and additionally showing the hydraulic tubing connected into the pair of ports in the sidewall of the first body cavity, the second body being rotated 90 degrees from the position shown in FIGURE 2 in order to show both of the second body passages;
FIGURE 7 is a view taken as along arrows VII—VII of FIGURE 4; and
FIGURE 8 is a view similar to FIGURE 5 and showing a typical one of the movable disconnect halves mated with a typical one of the fixed disconnect halves.

FIGURE 1 schematically represents an embodiment of the invention wherein the hydraulic arrangement includes a first hydraulic system with a pump 15A whose inlet port is connected by a line 16A into a reservoir 17A and whose outlet port is connected by a line 18A into a selector valve 19A and thence into either end of the first chamber 11A of the dual, tandem-type hydraulic actuator 10A. Return from the actuator first chamber 11A into the reservoir 17A is through valve 19A and line 20A. A second, independent hydraulic system has a pump 21A receiving fluid from a reservoir 23A through a line 22A and supplying fluid under pressure, through line 24A and selector valve 25A, to the second chamber 12A of the actuator 10A, fluid return to the reservoir 23A being through the valve 25A and line 26A. Either the first system with pump 15A or the second system with pump 21A is adequate for powering the actuator 10A, which positions, for example, an aileron of an aircraft; and the two systems are concurrently employed for increase of the reliability of the actuator. Besides the two hydraulic systems described above, there is included a utility system with an actuator 27A (utilized, for example, in positioning the landing gear of an airplane) which is connectible through selector valve 28A, lines 29A, 30A, and linked shut-off valves 31A, 32A into the pressure and return lines 18A, 20A of the first hydraulic system. Upon failure of the pump 15A, the utility actuator 27A is isolated from the first hydraulic system by closing shut-off valves 31A, 32A; with the shut-off valves open, the utility actuator operates as a part of the first hydraulic system. An auxiliary hydraulic pump 33A is selectively connectible into the first, second, or utility hydraulic systems through a flow control unit shown schematically at 34A.

In the example shown, the flow control device 34A comprises a pair of fixed, hydraulic quick-disconnect halves 87, 88 connected respectively by lines 40A, 37A with the pressure and return lines 18A, 20A of the first hydraulic system, and another pair of disconnect halves 89, 90 is connected through lines 45A, 44A into respective ports of a four-way valve 46A which supplies emergency fluid to the utility actuator 27A. The emergency reservoir 43A tees into line 44A connecting the disconnect half 90 to the valve 46A. Still another pair of fixed disconnect halves 91, 92 is connected into, respectively, the pressure and return lines 24A, 26A of the second hydraulic system through lines 42A, 41A. Hydraulic disconnects are well known in the art, and the device is not limited to the specific form of quick-disconnect halves shown and described.

As will be further described, the fixed disconnect halves 87 through 92 are disposed on the circumference of a circle, with the members of any given pair being located at opposite ends of a respective diameter of the circle. The fixed disconnect halves 87–92 operate in conjunction with a movable pair of hydraulic quick-disconnect halves 93, 94 linked by structure 95 and, as will be seen, preferably separated by 180 degrees and rotatable about the center of the circle in which the fixed disconnect halves 87–92 are disposed. Upon mating of the movable halves 93, 94 with a pair 89, 90 of the fixed halves 87–92, the inlet port of the auxiliary pump 33A is connected through line 38A, movable half 94, fixed half 90, and line 44A into the emergency reservoir 43A and selector valve 46A, while the auxiliary pump outlet port is connected with the emergency valve 46A through line 39A, movable half 93, fixed half 89, and line 45A. (Where a rupture exists in the first hydraulic system with pump 15A, it is preferred that the shut-off valves 31A, 32A be closed prior to these connections being made.) By rotating the movable disconnect halves 93, 94 to the right and mating them with the fixed halves 87, 88, the auxiliary pump 33A is connected into the first hydraulic system. Thus, the inlet port of auxiliary pump 33A is connected through line 38A, movable half 94, fixed half 88, line 37A, and line 20A into the first system reservoir 17A, while the pump outlet is connected through line 39A, movable half 93, fixed half 87, and line 40A into the pressure line 18A; check valve 47A prevents backflow into the first system pump 15A. Check valve 48A serves a similar function at the second system pump 21A when the movable connector halves 93, 94 are rotated to the left, from their position shown, and mated respectively with fixed connector halves 91, 92, whereupon the inlet port of auxiliary pump 33A is connected through line 88A, movable half 94, fixed half 92, and line 41A into the second system return line 26A, and the pump outlet is connected through line 39A, movable half 93, fixed half 91, and line 42A into the second system pressure line 24A. It will be noted that the first and second hydraulic systems, powered by pumps 15A, 21A, remain entirely independent of each other even though either one of them is augmented by the auxiliary pump 33A.

With reference now to FIGURES 2 and 3, the flow control device 34A comprises a first body 110 having a cavity 111 which is cylindrical in form. As shown in FIGURE 2, the first body 110 has first and second ends 112, 113 perforated by the bore or cavity 111 and bears a plurality of fixed hydraulic quick-disconnect halves such as 90 which are rigidly mounted on the first body. As long as their axes are parallel with the axis of the bore 111 and if their orientation and disposition is otherwise maintained as later specified, the mode or means of mounting the plurality of disconnect halves such as 90 is not critical. In the preferred embodiment, the first body 110 is provided with bores or recesses 116 (FIGURE 5) in which the fixed disconnect halves such as 90 are rigidly mounted. As seen upon added reference to FIGURE 4, the fixed disconnect halves 87-92 are spaced and arranged in a circle concentric with the axis of the first body bore 111 and are arranged in pairs spaced from each other by a given, uniform interval. Thus, one of the pairs comprises a first half 87 disposed at one end of a respective diameter of the circle in which the disconnect halves are arranged and a second half 88 located at the other end of the same diameter. Similarly arranged, another pair comprises a first half 91 and second half 92. A third, diametrically opposed pair 89, 90 is best seen in FIGURE 6 and is shown in FIGURE 8 as covered by movable disconnect halves 93, 94 (to be described).

As shown in FIGURE 5, each fixed disconnect half such as 90 comprises fixed structure in form of a tube 114 with a closed end 115 protruding from the first body first end 112 and an open end threadedly engaged within a passage 116 extending through the first body 110 and with which the interior of the tube 114 is continuous. Near its outer end 115, the wall of the tube 114 is pierced by one or more openings 117 to provide communication between the interior and exterior of the tube 114. Snugly but slidably encircling the tube 114 is a valve element in form of a sleeve 118 biased by a spring 119 to a first position in which its outer end interferes with the outer end portion 115 of the tube 114 and its wall sealingly covers the tube wall openings 117, thus closing off fluid flow through the fixed disconnect half 90. As will be seen, the sleeve 118 is movable, against force exerted by the spring 119, to a second position in which the tube openings 117 are uncovered and fluid can flow, through the openings 117 and past the outer end of the sleeve 118, into the fixed disconnect half 90. An annular boss 125 encircles the sleeve 118 and is slightly spaced from the outer end of the latter; this boss has inner and outer shoulders 126, 127.

A fitting 120 has a hollow interior continuous with the connector half passage 116, and, at its end extending outwardly from the first body second end 113, is threaded or otherwise adapted for connection with a respective hydraulic line (not shown). The fitting 120 thus forms a port communicating with the fixed connector half 90. Similar ports are provided for the other fixed disconnect halves and are arranged in pairs corresponding to the pairing (described above) of the fixed disconnect halves. Thus, with reference to FIGURES 1 and 4, fixed disconnect half 88 is ported into the return line 20A of the first hydraulic system through line 37A, while the other member 87 of the pair is ported into the pressure line 18A of the system through line 40A. The disconnect half pair 92, 91 similarly is ported into return line 26A and pressure line 24A of the second hydraulic system. The remaining pair 90, 89 (visible in FIGURES 1 and 2) is ported into the return line 44A and pressure line 45A of the emergency system employable for actuation of utility actuator 27A.

A second body 121 (FIGURES 2, 3) is of cylindrical form and of such diameter as to fit snugly against and within the sidewall of bore 111, within which the second body 121 is rotatable and axially slidable. The second body 121 has first and second end portions 122, 123 which extend out of each end of the bore 111 at the first and second ends 112, 113 of the first body 110. The second body 121 thus is rotatable about the axis of the bore 111 and axially movable therein for movement between positions which will be described in later paragraphs.

On the second body first end portion 122 is rigidly affixed a transversely extending cross-member 124 having two ends equally spaced on opposite sides of the axis of the second body 121.

First and second, movable hydraulic quick-disconnect halves 94, 93 are rigidly mounted on respective ends of the cross-member 124 and are spaced apart by an interval equal to the given interval diametrically separating the members of any given pair of the fixed disconnect halves such as 87, 88 (FIGURE 4). In other words, the movable disconnect halves 93, 94 are disposed at diametrically opposite points on the circumference of the circle in which the fixed disconnect halves, such as 87, are arranged, and they are in facing relation with the fixed disconnect halves. The axis of each movable disconnect half 93, 94 is parallel to the axis of the first body bore 111 (FIGURE 6).

As shown in FIGURE 5, each movable disconnect half (such as 94) comprises tubular structure 128 which extends from the cross-member 124 toward the first body 110 and conveniently is made as an integral part of the cross-member 124. Snugly and slidably mounted within the cylindrical interior of the structure 128, which is fixed relative to the cross-member 124, is a valve element in form of a cylindrical sleeve 129 having sidewall openings 130 and biased by a spring 131 to a first position in which the openings 130 are covered and hence closed by the wall of the fixed structure 129. An annular chamber 132 within the cross-member 124 encircles the sleeve 129 and is closed off from the sleeve openings 130 by the sidewall of the fixed structure 129 when the sleeve is in its first position, in which flow through the movable disconnect half 94 via the chamber 132 thus is prevented. The cylindrical inner surface of the sleeve 129 is of a diameter snugly receiving the annular boss 125 of the fixed connector half sleeve 118 and, spaced from its open end, contains a shoulder 133 which interferes with the shoulder 127 of the fixed disconnect half sleeve 118 when the latter is inserted. The outer diameter of the fixed tube end portion 115 is snugly received within the portion of the movable disconnect half sleeve 129 in which the openings 130 are formed.

A pair of ports 134, 135 (FIGURE 6) are spaced axially of the first body 110 and open into the interior 111 of the latter; each is threaded or otherwise adapted for connection into a respective hydraulic line 38A or 39A. Each port 134, 135 communicates with a respective one of the movable disconnect halves 93, 94 (FIGURE 2) through means that will now be described.

A pair of annular recesses 136, 137 (FIGURE 6), spaced along the axis of the bore 111, are formed in the sidewall of the latter in encircling relation to the bore axis and in such location as each to be in communication with a respective one of the sidewall ports 134, 135. The range of axial motion of the second body 121 in the bore 111 is limited by a flange or similar structure 138 rigidly affixed on the second body second end portion 123 and strikable on the first body 110 upon the second body 121 having reached the end of its travel in one direction; travel in the other direction is normally limited by interference arising upon the mating, as will be described, of the movable disconnect halves with a pair of the fixed disconnect halves. The recesses 136, 137 are of such length along the axis of the bore 111 as each to be always in register with the terminal openings 138, 140 of a pair of passages 141, 142 in the second body 121.

The passages 141, 142 extend axially within the second body 121, and their openings 139, 140 place each, at one end, in communication with a respective recess 136, 137. At their other ends, the passages 142, 141 (FIGURE 2) respectively open into the first and second movable disconnect halves 93, 94. Suitable seals 143 (FIGURE 6) are placed between the cylindrical bore sidewall 11 and the cylindrical second body 121 on each side of each of the recesses 136, 137. As shown in FIGURES 1 and 6, the first of the two sidewall ports 134, 135 of the first body 110 is connected through hydraulic line 38A into the inlet of the auxiliary pump 33A; the other port 135 is connected into the outlet of the pump 33A through line 39A.

With reference again to FIGURES 2 and 4, a means is shown which is actuatable for rotation and translation of the second body 121 between various positions thereof which will be enumerated below. A clevis 144 formed integrally with and preferably located on the center of the cross-member 124 has pivotally affixed therein, as by a suitable bolt, an arm 145 whose longer end may bear a ball or similar handle 148. The shorter end of the arm 145 is laterally slidable within the channel provided by an arcuate member 146 (refer also to FIGURE 7) rigidly mounted on the first body 110 by lugs 147 or the equivalent.

Raising the handle 148 will result in the second body 121 (refer also to FIGURE 2) being moved axially away from the first body 110 to a first position in which its two, movable disconnect halves 93, 94 are separated from all the fixed disconnect halves (such as 90) by spaces open to the atmosphere. In this position, there is absolutely no possibility of inter-connection between any of the fixed disconnect halves (such as 90) or between the same and either of the movable disconnect halves 93, 94; thus, there is no possibility of interconnection or leakage between the hydraulic lines (described above) which are connected into the fixed and movable disconnect halves. The handle 148 may be positioned, as shown, to place the movable disconnect halves 93, 94 in register with the pair 89, 90 (FIGURE 2) of fixed disconnect halves, which latter do not appear in FIGURE 4 because covered by the movable disconnect halves 93, 94. Upon actuation of the handle 148 (manually or by any appropriate mechanism) to place it at 148A, the second body 121 is turned on its axis to place the movable disconnect halves 93, 94 in register with the fixed disconnect half pair 91, 92. Movement of the handle to 148B brings the movable disconnect half pair 93, 94 into register wtih the fixed disconnect half pair 87, 88.

In any of the three positions 148, 148A, 148B shown, downward motion of the handle 148 (i.e., motion toward the first body 110) moves the second body cross-member 124 toward the first body 110 and mates the movable disconnect halves 93, 94 with a corresponding pair of fixed disconnect halves. The mating of movable half 94 with fixed half 90 is typical and is shown in FIGURE 8. The second body 121 with cross-member 124 thus is rotatably and axially movable from its first position, shown in FIGURE 2, to a plurality of other positions in which the movable disconnect halves 93, 94 are mated with a respective pair of the fixed disconnect halves on the first body 110. Note that, as shown in FIGURE 4, mating of the movable disconnect halves 93, 94 with any given pair of fixed disconnect halves always leaves the movable disconnect halves 93, 94 spaced, by an air space open to the atmosphere, from the remaining, fixed disconnect halves; again, there is no possibility of interconnection of or leakage between respective hydraulic systems connected into respective pairs of the fixed disconnect halves. As the second body 121 is moved along the axis of the first body bore 111 to mate each movable disconnect half 93 or 94 with a respective member of a respective pair of fixed disconnect halves, the fixed structure 115 (FIGURES 5, 8) on the fixed disconnect half (such as 90) engages the valve element 129 of the movable disconnect half (such as 94) and moves it from its first, closed position to a second position (shown in FIGURE 12) wherein fluid can flow past the valve element 129, through openings 130, to the mated fixed disconnect 90. Similarly, the fixed structure shoulder 133 of the movable disconnect half 94 strikes the valve element 118 of the fixed disconnect half 90 and moves it from its first, closed position to an open position in which the openings 117 are uncovered and in register with the openings 130, thus allowing fluid to flow between the two disconnect halves 94, 90.

While only one embodiment of the invention has been described in detail herein and shown in the accompanying drawing, it will be evident that various modifications are possible in the arrangement and construction of its components without departing from the scope of the invention.

We claim:
1. A hydraulic flow-control device comprising:
a first body having rigidly mounted thereon a plurality of spaced pairs of fixed, hydraulic quick-disconnect halves, the two disconnect halves of each pair being spaced from each other by a given interval;
a plurality of ports each communicating with a respective one of the fixed disconnect halves and adapted for connection with a respective hydraulic line;
a second body having rigidly mounted thereon a pair of hydraulic quick-disconnect halves spaced apart by an interval equal to said given interval;
and a pair of ports each communicating with a respective one of the second body disconnect halves and adapted for connection into respective hydraulic lines,
the second body being movable between a first position in which its disconnect halves are separated from all the fixed disconnect halves by air of the atmosphere and a plurality of other positions in each of which other positions the second body disconnect halves are mated with a respective pair of the fixed disconnect halves and separated from all the other fixed disconnect halves by air of the atmosphere.

2. The device recited in claim 2, the fixed disconnect halves being arranged in a circle.

3. The device recited in claim 1, the fixed disconnect halves being arranged in a circle about a fixed axis and the second body being rotatable about the fixed axis for obtaining movement between said first position and said plurality of other positions.

4. The device recited in claim 1, the fixed disconnect halves being arranged in a circle about a fixed axis, the second body disconnect halves being disposed at diametrically opposite points on the circumference of the circle, and the second body being rotatable and axially movable on said axis for movement between said first position and said plurality of other positions.

5. The device recited in claim 1 and further including means actuatable for rotation and translation of the second body between said first position and said plurality of other positions.

6. The device recited in claim 1, the port communicating with one of each pair of fixed disconnect halves being connected to a return line and the port communicating with the other of each pair of fixed disconnect halves being connected to the pressure line of a respective hydraulic system and the pair of ports communicating with the second body disconnect halves being connected to the inlet and outlet ports of a hydraulic pump.

7. A hydraulic arrangement comprising:
a plurality of independent hydraulic systems each of which has a pressure line and a return line;
a hydraulic pump having an inlet port and an outlet port;
a first body having rigidly mounted thereon a plurality of spaced pairs of fixed, hydraulic quick-disconnect halves, the two disconnect halves of each pair being spaced from each other by a given interval;
a plurality of ports each communicating with a respective one of the fixed disconnect halves, the port communicating with one disconnect half of each pair of disconnect halves being connected into the return line of a respective one of said hydraulic systems and the port communicating with the other disconnect half of each pair of disconnect halves being connected into the pressure line of the respective hydraulic system;
a second body having rigidly mounted thereon a pair of hydraulic quick-disconnect halves spaced apart by an interval equal to said given interval;
and a pair of ports each communicating with a respective one of the second body disconnect halves and connected respectively into the pressure port and inlet port of the hydraulic pump,
the second body being movable between a first position in which its disconnect halves are separated from all the fixed disconnect halves by air of the atmosphere and a plurality of other positions in each of which other positions the second body disconnect halves are mated with a respective pair of the fixed disconnect halves and separated from all the other fixed disconnect halves by air of the atmosphere.

8. A hydraulic flow-control device comprising:
a first body having a cylindrical bore with a sidewall and an axis and further having first and second ends;
first and second, spaced, annular recesses formed in the bore sidewall and encircling the bore axis;
first and second ports in the first body opening respectively into the first and second recesses, said ports being adapted for connection into respective hydraulic lines;
a plurality of pairs of fixed, hydraulic quick-disconnect halves disposed in a circle concentric with the bore axis and rigidly mounted on the first body, each of said pairs of disconnect halves comprising a first disconnect half disposed at one end and a second disconnect half disposed at the other end of a respective diameter of the circle in which the disconnect halves are disposed;
a plurality of ports each communicating with a respective one of the fixed disconnect halves and adapted for connection into a hydraulic line;
a second, cylindrical body rotatable and axially slidable in the first body cavity and having a first end extending out of the cylindrical cavity at the first body first end;
a cross-member, on said first end of the second body, having two ends;
first and second, movable hydraulic quick-disconnect halves rigidly mounted on respective ends of the cross-member, the movable and fixed disconnect halves being in facing relation to each other;
first and second passages in the second body communicating respectively between the first movable disconnect half and first recess and the second movable disconnect half and second recess;
the second body being rotatable between a plurality of positions in each of which positions each of the movable disconnect halves lies in register with a respective one of the fixed disconnect halves, the second body, when in each of said positions, being movable along the axis of the bore between a first position in which the movable disconnect halves are separated by an air space open to the atmosphere from all the fixed disconnect halves and a second position in which each movable disconnect half is mated with a respective, fixed disconnect half and spaced from all the remaining fixed disconnect halves by an air space open to the atmosphere.

9. The device of claim 7, the second body having a second end extending out of the cylindrical cavity at the first body second end;
said device further comprising structure on the second body second end strikable against the first body second end for limiting travel of the cross-member away from the first end of the first body.

10. The device of claim 7 and further comprising a seal between the cylindrical cavity bore and second, cylindrical body on each side of each of the recesses in the bore sidewall.

11. A hydraulic arrangement comprising:
a plurality of independent hydraulic systems each of which has a pressure line and a return line;
a hydraulic pump having an inlet port and an outlet port;
a first body having a cylindrical bore with a sidewall and an axis and further having first and second ends;
first and second, spaced, annular recesses in the bore sidewall and encircling the bore axis;
first and second ports in the first body which open respectively into the first and second recesses and are respectively connected into the hydraulic pump inlet and outlet ports;
a plurality of pairs of fixed, hydraulic quick-disconnect halves disposed in a circle concentric with the bore axis and rigidly mounted on the first body, each of said pairs of disconnect halves comprising a first disconnect half disposed at one end and a second disconnect half disposed at the other end of a respective diameter of the circle in which the disconnect halves are disposed;
a plurality of ports each communicating with a respective one of the fixed disconnect halves, the ports being arranged in pairs corresponding to the pairs of fixed disconnect halves and one port of each pair of ports being connected into the return line of a respective one of said hydraulic systems and the other port of each pair of ports being connected into the pressure line of the respective one of said hydraulic systems;
a second, cylindrical body rotatable and axially slidable in the first body cavity and having a first end extending out of the cylindrical cavity at the first body first end;
a cross-member, on said first end of the second body, having two ends;
first and second, movable hydraulic quick-disconnect halves rigidly mounted on respective ends of the cross-member, the movable and fixed disconnect halves being in facing relation to each other;
first and second passages in the second body communicating respectively between the first movable disconnect half and first recess and the second movable disconnect half and second recess;

the second body being rotatable between a plurality of positions in each of which positions each of the movable disconnect halves lies in register with a respective one of the fixed disconnect halves, the second body, when in each of said positions, being movable along the axis of the bore between a first position in which the movable disconnect halves are separated by an air space open to the atmosphere from all the fixed disconnect halves and a second position in which each movable disconnect half is mated with a respective, fixed disconnect half and spaced from all the remaining fixed disconnect halves by an air space open to the atmosphere.

12. A hydraulic flow-control device comprising:

a first body having a cylindrical bore with a sidewall and an axis and further having first and second ends;

first and second, spaced, annular recesses in the bore sidewall and encircling the bore axis;

first and second ports in the first body opening respectively into the first and second recesses, said ports being adapted for connection into respective hydraulic lines;

a plurality of pairs of fixed, hydraulic quick-disconnect halves disposed in a circle concentric with the bore axis and rigidly mounted on the first body, each of said pairs of disconnect halves comprising a first disconnect half disposed at one end and a second disconnect half disposed at the other end of a respective diameter of the circle in which the disconnect halves are disposed;

a valve element in each of said fixed disconnect halves movable between a first position in which fluid flow through the fixed disconnect half is closed off and a second position in which fluid can flow through the disconnect half past the valve element;

a plurality of ports each communicating with a respective one of the fixed disconnect halves and adapted for connection into a hydraulic line;

a second, cylindrical body rotatable and axially slidable in the first body cavity and having a first end extending out of the cylindrical cavity at the first body first end;

a cross-member, on said first end of the second body, having two ends;

first and second, movable hydraulic quick-disconnect halves rigidly mounted on respective ends of the cross-member, the movable and fixed disconnect halves being in facing relation to each other;

a valve element, in each of said movable disconnect halves, movable between a first position in which fluid flow through the movable disconnect half is closed off and a second position in which fluid can flow through the movable disconnect half past the valve element;

a first passage in the second body communicating between the first movable disconnect half and the first recess;

first and second passages in the second body communicating respectively between the first movable disconnect half and first recess and the second movable disconnect half and second recess;

the second body being rotatable between a plurality of positions in each of which positions each of the movable disconnect halves lies in register with a respective one of the fixed disconnect halves, the second body, when in each of said positions, being movable along the axis of the bore between a first position in which the movable disconnect halves are separated by an air space open to the atmosphere from all the fixed disconnect halves and a second position in which each movable disconnect half is mated with a respective, fixed disconnect half and spaced from all the remaining fixed disconnect halves by an air space open to the atmosphere;

fixed structure on each of the fixed disconnect halves so located as to strike and move to its second position the valve element of one of said movable disconnect halves when its fixed disconnect half is mated with the latter;

and structure rigidly mounted on each of the movable disconnect halves and so located as to strike and move to its second position the valve element of one of said fixed disconnect halves when its movable disconnect half is mated with the latter.

References Cited in the file of this patent
UNITED STATES PATENTS

| | | |
|---|---|---|
| 1,973,610 | Connors | Sept. 11, 1934 |
| 2,638,915 | Mitchell | May 19, 1953 |
| 2,930,633 | Ethington | Mar. 29, 1960 |

UNITED STATES PATENT OFFICE

CERTIFICATE OF CORRECTION

Patent No. 3,112,765   December 3, 1963

Jackson R. Crissey et al.

It is hereby certified that error appears in the above numbered patent requiring correction and that the said Letters Patent should read as corrected below.

Column 6, line 67, for the claim reference numeral "2" read -- 1 --.

Signed and sealed this 28th day of April 1964.

(SEAL)
Attest:
ERNEST W. SWIDER

Attesting Officer

EDWARD J. BRENNER
Commissioner of Patents